United States Patent
Yang et al.

(10) Patent No.: US 11,070,293 B2
(45) Date of Patent: Jul. 20, 2021

(54) METHOD AND DEVICE FOR AMPLIFYING UPLINK LIGHT OF PASSIVE OPTICAL NETWORK, AND STORAGE MEDIUM

(71) Applicant: ZTE CORPORATION, Guangdong (CN)

(72) Inventors: Wei Yang, Guangdong (CN); Xingang Huang, Guangdong (CN); Jiangyan He, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/649,888

(22) PCT Filed: Sep. 21, 2018

(86) PCT No.: PCT/CN2018/107046
§ 371 (c)(1),
(2) Date: Mar. 23, 2020

(87) PCT Pub. No.: WO2019/057171
PCT Pub. Date: Mar. 28, 2019

(65) Prior Publication Data
US 2020/0274619 A1 Aug. 27, 2020

(30) Foreign Application Priority Data
Sep. 21, 2017 (CN) .......................... 201710858668.3

(51) Int. Cl.
*H04B 10/293* (2013.01)
*H04Q 11/00* (2006.01)

(52) U.S. Cl.
CPC ..... *H04B 10/2931* (2013.01); *H04Q 11/0067* (2013.01)

(58) Field of Classification Search
None
See application file for complete search history.

(56) References Cited

U.S. PATENT DOCUMENTS

| 8,724,997 B2 | 5/2014 | Zhang et al. |
| 8,736,956 B2 | 5/2014 | Tanaka et al. |

(Continued)

FOREIGN PATENT DOCUMENTS

| CN | 101350670 A | 1/2009 |
| CN | 101420412 A | 4/2009 |

(Continued)

OTHER PUBLICATIONS

Prat, "Optical Network Unit Based on a Bidirectional Reflective Semiconductor Optical Amplifier for Fiber-to-the-Home Networks", IEEE Photonics Technology Letters, vol. 17, No. 1, Jan. 2005 (Year: 2005).*

(Continued)

*Primary Examiner* — Darren E Wolf
(74) *Attorney, Agent, or Firm* — Li & Cai Intellectual Property (USA) Office

(57) ABSTRACT

The present disclosure provides a method and a device for amplifying uplink light of a passive optical network, and a computer-readable storage medium. The passive optical network includes an optical network unit, an optical line terminal, and an optical amplifier provided between the optical network unit and the optical line terminal, and the method include: receiving a registration signal transmitted from the optical line terminal; determining a gain value of the optical amplifier, and performing gain value adjustment on the optical amplifier according to the determined gain value; and completing registration when an uplink optical signal transmitted to the optical line terminal through the optical amplifier reaches preset power.

18 Claims, 5 Drawing Sheets

(56) References Cited

U.S. PATENT DOCUMENTS

| | | | |
|---|---|---|---|
| 8,934,168 B2 | 1/2015 | He et al. | |
| 2009/0208227 A1* | 8/2009 | Yoshida | H04B 10/2939 398/202 |
| 2011/0164310 A1* | 7/2011 | Tanaka | H01S 5/0612 359/344 |
| 2014/0161453 A1* | 6/2014 | Onaka | H04B 10/2914 398/67 |

FOREIGN PATENT DOCUMENTS

| | | | |
|---|---|---|---|
| CN | 102035596 A | | 4/2011 |
| CN | 102171896 A | | 8/2011 |
| CN | 102238438 A | | 11/2011 |
| CN | 104954898 A | * | 9/2015 |
| CN | 104954898 A | | 9/2015 |
| CN | 105812065 A | | 7/2016 |
| CN | 105846902 A | | 8/2016 |

OTHER PUBLICATIONS

WIPO, International Search Report dated Dec. 28, 2018.
European Patent Office, The extended European search report dated May 6, 2021 for application No. EP18859085.5.

* cited by examiner

METHOD AND DEVICE FOR AMPLIFYING UPLINK LIGHT OF PASSIVE OPTICAL NETWORK, AND STORAGE MEDIUM

CROSS-REFERENCE TO RELATED APPLICATIONS

This is a National Phase Application filed under 35 U.S.C. 371 as a national stage of PCT/CN2018/107046, filed on Sep. 21, 2018, an application claiming the priority of Chinese Patent Application No. 2017108,58668,3, filed on Sep. 21, 2017, the contents of which are incorporated herein in their entirety by reference.

TECHNICAL FIELD

The present disclosure relates to optical network systems, and in particular, to a method and a device for amplifying uplink light of a passive optical network, and a computer-readable storage medium.

BACKGROUND

At present, the technology of Passive Optical Network (PON) is being continuously updated. However, as a single-wavelength modulation rate increases, receiver sensitivity decreases, resulting in a decrease in link power budget. Since an Optical Distribution Network (ODN) cannot be changed, how to increase the link power budget has become a problem which must be solved.

Chinese Patent CN201010173400.4 entitled "LONG-DISTANCE BOX AND METHOD FOR PROCESSING UPLINK AND DOWNLINK LIGHTS THEREOF" discloses a method, in which an amplification device is provided between an Optical Line Terminal (OLT) and an Optical Network Unit (ONU) to separately amplify uplink light and downlink light, thereby increasing a transmission distance. FIG. 3 is a structural schematic diagram of a PON in the prior art. However, in a PON system, attenuation of links from different ONUs to an OLT differs, with a maximum difference of 15 dB, and there may be a difference of 5 dB in transmitting optical power of the different ONUs. If an uplink Optical Amplifier (OA) is added, a maximum difference in receiving powers of an OLT receiver may reach 20 dB; and if a gain of the uplink OA is too large or too small, an uplink signal with high power may be amplified too much and thus damage the OLT receiver, or an uplink signal with low power may not be amplified enough to be correctly received by the OLT. Therefore, there is a risk to use an OA having a fixed gain to amplify uplink optical signals of all ONUs.

SUMMARY

According to an aspect of the present disclosure, a method for amplifying uplink light of a PON is provided, the PON includes an ONU, an OLT, and an OA provided between the ONU and the OLT, and the method includes the following steps: receiving a registration signal transmitted from the OLT; determining a gain value of the OA, and performing gain value adjustment on the OA according to the determined gain value; and completing registration when an uplink optical signal transmitted to the OLT through the OA reaches preset power.

According to a second aspect of the present disclosure, an optical network unit (ONU) is provided, an OA is provided between the ONU and an OLT, and the ONU includes: a receiving module configured to receive a registration signal transmitted from the OLT; a gain value determining module configured to determine a gain value of the OA; a gain value adjustment module configured to perform gain value adjustment on the OA according to the determined gain value; and a registration module configured to complete registration when an uplink optical signal transmitted to the OLT through the OA reaches preset power.

According to a third aspect of the present disclosure, an apparatus is provided, and the apparatus includes a processor, and a memory configured to store computer instructions. The processor is configured to execute the computer instructions stored in the memory, so as to perform the above method for amplifying uplink light of a passive optical network.

According to a fourth aspect of the present disclosure, a computer-readable storage medium is provided, and the computer-readable storage stores one or more programs which, when executed by one or more processors, cause the one or more processors to perform the above method for amplifying uplink light of a passive optical network.

DETAILED DESCRIPTION

It should be understood that specific embodiments described herein are merely for explaining the present disclosure, but do not make any limitation to the present disclosure.

In the following description, the words used to indicate elements, such as "module", "component" or "unit", are used only for facilitating the description of the present disclosure, but have no particular meanings in themselves. Therefore, the words "module", "component" or "unit" may be used interchangeably.

To facilitate an understanding of the present disclosure, the present disclosure will be described in detail below with reference to exemplary embodiments.

Figure 1:
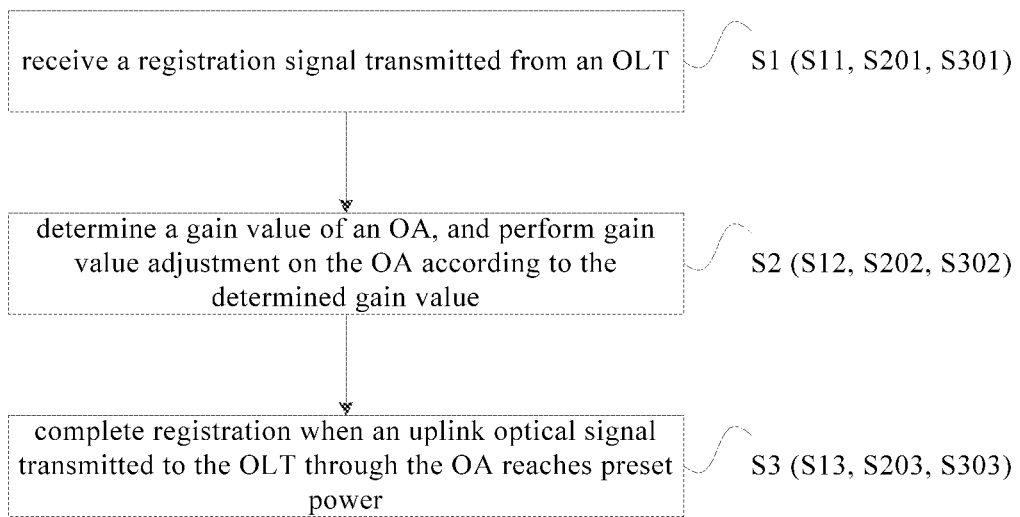
FIG. 1 is a flowchart illustrating a method for amplifying uplink light of a PON according to an embodiment of the present disclosure.

FIG. 1 is a flowchart illustrating a method for amplifying uplink light of a PON according to an embodiment of the present disclosure. The PON includes an ONU, an OLT, and an OA provided between the ONU and the OLT, and as shown in FIG. 1, the method includes steps S1 to S3.

In step S1, a registration signal transmitted from the OLT is received.

In step S2, a gain value of the OA is determined, and the OA is subjected to gain value adjustment according to the determined gain value.

In step S3, registration is completed when an uplink optical signal transmitted to the OLT through the OA reaches preset power.

With the above technical solution, the gain value of the OA can be adjusted according to the registration signal transmitted from the OLT and received by the ONU, so that power of the uplink optical signal can be adjusted to allow the OLT to receive an uplink optical signal with qualified power. Therefore, the above technical solution can solve two problems occurring when OAs used by all ONUs have a same gain, one problem being that optical signals of part of the ONUs are still too small after being amplified and thus fail to meet requirements of bit error rate of an OLT receiver, and the other problem being that optical signals of part of the ONUs are too large after being amplified and thus cause damage to the OLT and the OLT receiver.

With reference to FIG. 1, a method for amplifying uplink light of a PON is provided according to an embodiment of the present disclosure. The PON includes a plurality of ONUs, an OLT, and an OA provided between each ONU and the OLT. The method includes steps S1 to S3.

In step S1, a registration signal transmitted from the OLT is received.

Figure 4:
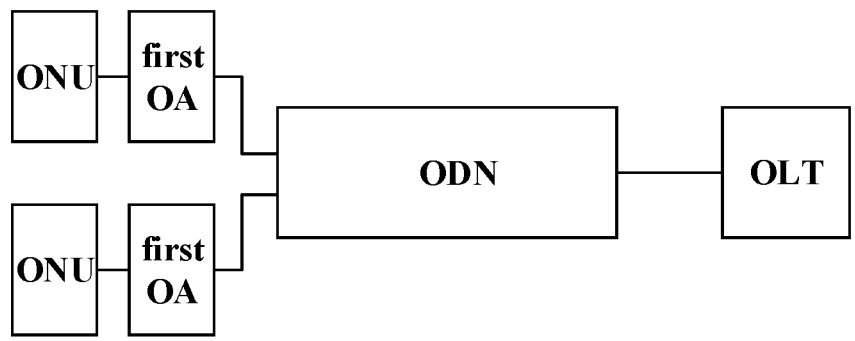
FIG. 4 is a structural schematic diagram of a PON according to an embodiment of the present disclosure.

In the embodiment of the present disclosure, the OA includes a first OA located at an ONU side, the first OA is independent of the ONU side, or the first OA may be integrated with an ONU to form an ONU optical module, in which the ONU includes a downlink signal receiver and an uplink signal transmitter, which facilitates saving production costs and reducing installation of controls. FIG. 4 is a structural schematic diagram of a PON according to an embodiment of the present disclosure.

In an embodiment of the present disclosure, the first OA may be, for example, a Semiconductor Optical Amplifier (SOA). However, the present disclosure does not make any limitation to specific type of the first OA, as long as the first OA may amplify uplink optical signal transmitted from the ONU.

When the method is performed, the OLT needs to transmit the registration signal to the ONU first. The registration signal includes transmitting power of the OLT.

In step S2, a gain value of the OA is determined, and the OA is subjected to gain value adjustment according to the determined gain value.

When the OA is the first OA, the step of determining THE gain value of the OA is a step of determining a first gain value of the first OA. The step of determining the first gain value of the first OA includes steps S21 and S22.

In step S21, a link attenuation value is determined according to receiving power of the ONU, and downlink signal transmitting power of the OLT when transmitting the registration signal.

The receiving power of the ONU when receiving the registration signal is detected, and then the link attenuation value is obtained according to the receiving power of the ONU, and the downlink signal transmitting power of the OLT when transmitting the registration signal.

It should be noted that, when the OLT transmits the registration signal to an unregistered ONU for registration of a new ONU, the registration signal includes information about the downlink signal transmitting power. In some cases, the OLT may detect its signal transmitting power by itself, and also may add information about the signal transmitting power to a downlink registration signal, and send the downlink registration signal to the ONU.

The link attenuation value is equal to a result of the downlink signal transmitting power of the OLT when transmitting the registration signal minus the receiving power of the ONU when receiving the registration signal.

In step S22, the first gain value of the first OA is determined according to transmitting power of the ONU, receiving power of the OLT, and the link attenuation value.

In an embodiment of the present disclosure, the transmitting power of the ONU and the receiving power of the OLT are known in advance. A device, which is configured to detect ONU-side transmitting optical power, of a transmission assembly of the ONU optical module may be used to obtain the transmitting power of the ONU.

Then, the first gain value of the first OA may be determined according to the link attenuation value and receiving power of the OLT.

Specifically, the first gain value of the first OA is equal to a result of the link attenuation value plus the receiving power of the OLT and minus the transmitting power of the ONU. Thus, the first gain value of the first OA is determined.

In step S3, registration is completed when an uplink optical signal transmitted to the OLT through the OA reaches preset power.

After determining the first gain value of the first OA, an uplink optical signal is transmitted from the ONU, amplified by the first OA and then transmitted to the OLT. If the receiving power of the OLT when receiving the uplink optical signal falls within a receiving range required by a bit error rate, which indicates that the uplink optical signal transmitted to the OLT reaches the preset power, the registration is completed.

With the above technical solution, the gain value of the OA can be adjusted according to the registration signal transmitted from the OLT and received by the ONU, so that power of the uplink optical signal can be adjusted to allow the OLT to receive an uplink optical signal with qualified power. Therefore, the above technical solution can solve two problems occurring when OAs used by all ONUs have a same gain, one problem being that optical signals of part of the ONUs are still too small after being amplified and thus fail to meet requirements of bit error rate of an OLT receiver, and the other problem being that optical signals of part of the ONUs are too large after being amplified and thus cause damage to the OLT and the OLT receiver.

In the embodiment of the present disclosure, if the first gain value of the first OA obtained through the calculation is less than zero, which indicates that the transmitting power of the ONU is too large even without using the first OA, it is unnecessary to amplify the uplink optical signal transmitted from the ONU, so that the first gain value of the first OA and the link attenuation value are adjusted to zero by a variable optical attenuator. Thus, an uplink optical signal with qualified power can be received by the OLT. In one embodiment, the variable optical attenuator may be integrated with the ONU optical module, and may adopt technologies of Micro-Electro-Mechanical Systems (MEMS), silicon photonics, and so on.

As shown in FIG. 1, the present disclosure provides another method for amplifying uplink light of a PON. The PON, to which the method may be applied, includes a plurality of ONUs, an OLT, and an OA provided between each ONU and the OLT. The method includes steps S11 to S13.

In step S11, a registration signal transmitted from the OLT is received.

In the embodiment of the present disclosure, the OA includes a first OA located at an ONU side, the first OA is independent of the ONU side, or the first OA may be integrated with an ONU to form an ONU optical module, in which the ONU includes a downlink signal receiver and an uplink signal transmitter, which facilitates saving production costs and reducing installation of controls.

In an embodiment of the present disclosure, the first OA may be, for example, an SOA. However, the present disclosure does not make any limitation to specific type of the first OA, as long as the first OA may amplify uplink optical signal transmitted from the ONU.

When the method is performed, the OLT needs to transmit the registration signal to the ONU first. The registration signal does not include transmitting power of the OLT.

In step S12, a gain value of the OA is determined, and the OA is subjected to gain value adjustment according to the determined gain value.

Specifically, the step of determining the gain value of the OA includes steps S121 and S122.

In step S121, when the registration signal transmitted from the OLT is received, a basic value for current gain value adjustment is determined.

When the ONU receives the registration signal, a basic value for first gain value adjustment of the first OA is determined, and the gain value adjustment is performed based on the basic value.

Furthermore, the step S121 includes the following steps: when receiving a registration signal transmitted from the OLT for the first time, determining a minimum value of a first gain value of the first OA as the basic value for current gain value adjustment; and when receiving a registration signal transmitted from the OLT for the $n^{th}$ time, determining the first gain value of the first OA obtained after the $(n-1)^{th}$ adjustment as the basic value for the $n^{th}$ gain value adjustment, where n is an integer greater than or equal to 2.

In step S122, the basic value is adjusted forward according to a preset gain step value to obtain the first gain value of the first OA after the current adjustment.

After determining a gain value, the gain value is increased by the preset step value, that is, the gain value is increased by a constant value, so as to obtain the first gain value of the first OA after the current adjustment.

In step S13, registration is completed when an uplink optical signal transmitted to the OLT through the OA reaches preset power.

After determining the first gain value of the first OA, an uplink optical signal is transmitted from the ONU, amplified by the first OA and then transmitted to the OLT. If the power of the OLT when receiving the uplink optical signal is an optimal receiving power of the OLT, the registration is completed. However, if the uplink optical signal transmitted to the OLT through the first OA does not reach the preset power, the OLT continues to transmit a downlink optical signal of the registration signal to the ONU, and the ONU side continues to receive the new registration signal transmitted from the OLT. Then, the steps S11 to S13 are repeated until the uplink optical signal transmitted to the OLT through the first OA reaches the preset power, and then the registration is completed.

With the above technical solution, the ONU may receive the registration signals continuously transmitted from the OLT, and accordingly the first gain value of the first OA may be evenly increased, so that power of the uplink optical signals are adjusted, and the registration is not completed until the uplink optical signal transmitted to the OLT through the first OA reaches the preset power, that is, an uplink optical signal with qualified power can be received by the OLT. Therefore, the above technical solution can solve two problems occurring when OAs used by all ONUs have a same gain, one problem being that optical signals of part of the ONUs are still too small after being amplified and thus fail to meet requirements of bit error rate of an OLT receiver, and the other problem being that optical signals of part of the ONUs are too large after being amplified and thus cause damage to the OLT and the OLT receiver.

As shown in FIG. 1, the present disclosure provides another method for amplifying uplink light of a PON. The PON, to which the method may be applied, includes a plurality of ONUs, an OLT, and an OA provided between each ONU and the OLT. The method includes steps S201 to S203.

In step S201, a registration signal transmitted from the OLT is received.

Figure 5:
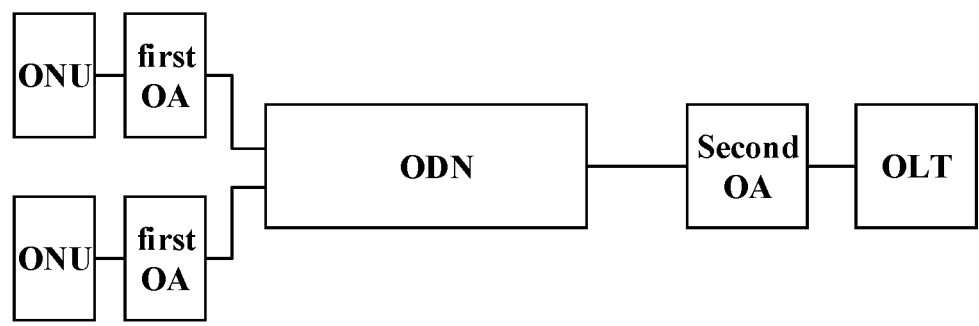
FIG. 5 is another structural schematic diagram of a PON according to an embodiment of the present disclosure.
Figure 6A:
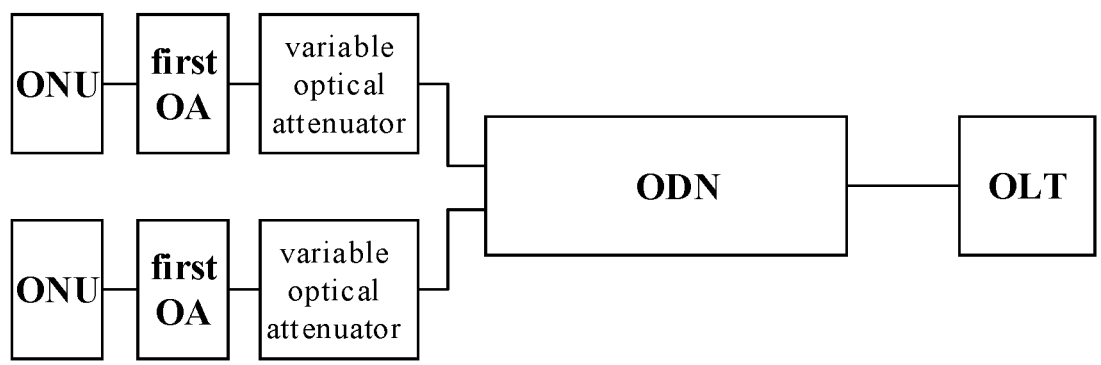
FIG. 6a is yet another structural schematic diagram of a PON according to an embodiment of the present disclosure.
Figure 6B:
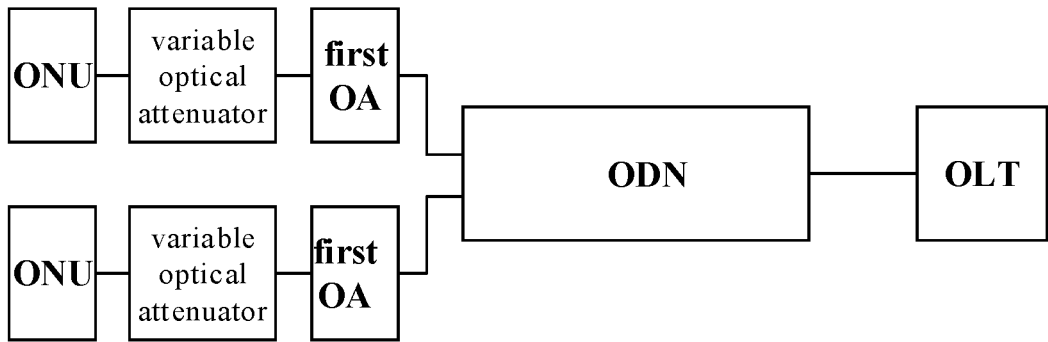
FIG. 6b is yet another structural schematic diagram of a PON according to an embodiment of the present disclosure.
Figure 7A:
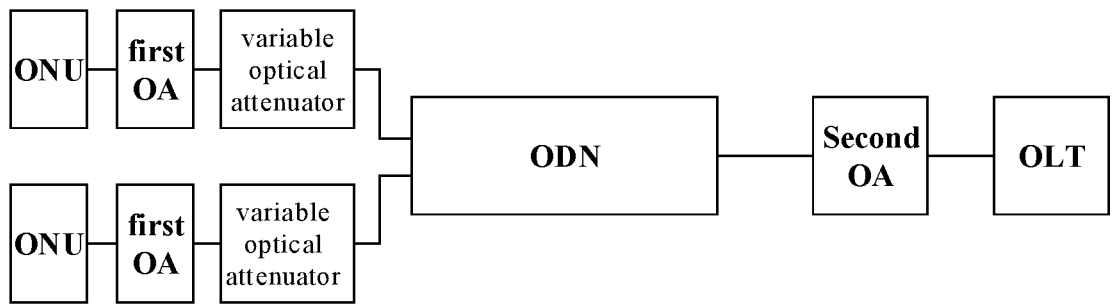
FIG. 7a is yet another structural schematic diagram of a PON according to an embodiment of the present disclosure.
Figure 7B:
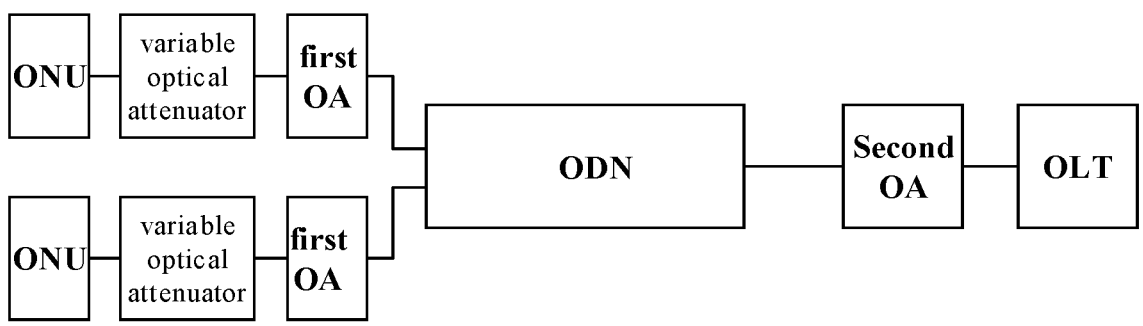
FIG. 7b is yet another structural schematic diagram of a PON according to an embodiment of the present disclosure.

In the embodiment of the present disclosure, the OA includes a first OA located at an ONU side and a second OA located at an OLT side. The first OA is independent of the ONU side, or the first OA may be integrated with an ONU to form an ONU optical module, in which the ONU includes a downlink signal receiver and an uplink signal transmitter, which facilitates saving production costs and reducing installation of controls. The second OA is independent of the OLT side, or the second OA is integrated with the OLT, which also facilitates saving production costs and reducing installation of controls. FIG. 5 is another structural schematic diagram of a PON according to an embodiment of the present disclosure.

In an embodiment of the present disclosure, the first OA may be, for example, an SOA. However, the present disclosure does not make any limitation to specific type of the first OA, as long as the first OA may amplify uplink optical signals transmitted from the ONU.

In an embodiment of the present disclosure, the second OA may be, for example, an SOA, and the second OA is a fixed-gain OA. However, the present disclosure does not make any limitation to specific type of the second OA, as long as the second OA may amplify the uplink optical signals transmitted from the ONU.

When the method is performed, the OLT needs to transmit the registration signal to the ONU first. The registration signal includes transmitting power of the OLT.

In step S202, a gain value of the OA is determined, and the OA is subjected to gain value adjustment according to the determined gain value.

The step of determining the gain value of the OA is a step of determining a first gain value of the first OA. The step of determining the first gain value of the first OA includes steps S2020 to S2022.

In step S2020, a second gain value of the second OA is determined. For easily making a distinction, a gain value of the second OA is named as the second gain value in the embodiment of the present disclosure.

In step S2021, a link attenuation value is determined according to receiving power of the ONU and downlink signal transmitting power of the OLT when transmitting the registration signal.

The receiving power of the ONU when receiving the registration signal is detected, and then the link attenuation value is obtained according to the receiving power of the ONU and the downlink signal transmitting power of the OLT when transmitting the registration signal.

It should be noted that, when the OLT transmits the registration signal to an unregistered ONU for registration of a new ONU, the registration signal includes information about the downlink signal transmitting power. In some cases, the OLT may detect its signal transmitting power by itself, and also may add information about the signal transmitting power to a downlink registration signal, and send the downlink registration signal to the ONU.

The link attenuation value is equal to a result of the downlink signal transmitting power of the OLT when transmitting the registration signal minus the receiving power of the ONU when receiving the registration signal.

In step S2022, the first gain value of the first OA is determined according to transmitting power of the ONU, receiving power of the OLT, the determined second gain value of the second OA, and the link attenuation value.

In an embodiment of the present disclosure, the transmitting power of the ONU and the receiving power of the OLT are known in advance. A device, which is configured to detect ONU-side transmitting optical power, of a transmission assembly of the ONU optical module may be used to obtain the transmitting power of the ONU, and then the first gain value of the first OA is determined according to the transmitting power of the ONU, the link attenuation value and the receiving power of the OLT.

Specifically, the first gain value of the first OA is equal to a result of the link attenuation value plus the receiving power of the OLT minus the transmitting power of the ONU and then minus the second gain value. Thus, the first gain value of the first OA is determined.

In step S203, registration is completed when an uplink optical signal transmitted to the OLT through the OA reaches preset power.

After determining the first gain value of the first OA, an uplink optical signal is transmitted from the ONU, amplified by the first OA and the second OA, and then transmitted to the OLT. If the receiving power of the OLT when receiving the uplink optical signal falls within a receiving range required by a certain bit error rate, which indicates that the uplink optical signal transmitted to the OLT reaches the preset power, the registration is completed.

With the above technical solution, the first gain value of the first OA can be adjusted according to the link attenuation value, so that power of the uplink optical signal can be adjusted to allow the OLT to receive an uplink optical signal with qualified power, that is, the receiving power of the OLT when receiving the uplink optical signal falls within a receiving range required by a certain bit error rate. Therefore, the above technical solution can solve two problems occurring when OAs used by all ONUs have a same gain, one problem being that optical signals of part of the ONUs are still too small after being amplified and thus fail to meet requirements of bit error rate of an OLT receiver, and the other problem being that optical signals of part of the ONUs are too large after being amplified and thus cause damage to the OLT and the OLT receiver.

In an embodiment of the present disclosure, filters are installed downstream of the first OA and/or downstream of the second OA along transmission paths of the uplink optical signals to filter out Amplified Spontaneous Emission (ASE) noise, thereby achieving optimizing signal-to-noise ratio.

In an embodiment of the present disclosure, if the first gain value of the first OA obtained through the calculation is less than zero, which indicates that the transmitting power of the ONU is too large even without using the first OA, it is unnecessary to amplify the uplink optical signal transmitted from the ONU, so that the first gain value of the first OA and the link attenuation value are adjusted to zero by a variable optical attenuator. Thus, an uplink optical signal with qualified power can be received by the OLT. In an embodiment, the variable optical attenuator may be integrated with the ONU optical module, and may adopt technologies of MEMS, silicon photonics, and so on. FIGS. 6a, 6b, 7a and 7b are other structural schematic diagrams of PONs according embodiments of the present disclosure.

As shown in FIG. 1, the present disclosure further provides a method for amplifying uplink light of a PON. The PON, to which the method may be applied, includes a plurality of ONUs, an OLT, and an OA provided between each ONU and the OLT. The method includes steps S301 to S303.

In step S301, a registration signal transmitted from the OLT is received.

In an embodiment of the present disclosure, the OA include a first OA located at an ONU side and a second OA located at an OLT side. The first OA is independent of the ONU side, or the first OA may be integrated with an ONU to form an ONU optical module, in which the ONU includes a downlink signal receiver and an uplink signal transmitter, which facilitates saving production costs and reducing installation of controls. The second OA is independent of the OLT side, or the second OA is integrated with the OLT, which also facilitates saving production costs and reducing installation of controls.

In an embodiment of the present disclosure, the first OA may be, for example, an SOA. However, the present disclosure does not make any limitation to specific type of the first OA, as long as the first OA may amplify uplink optical signals transmitted from the ONUs.

In an embodiment of the present disclosure, the second OA may be, for example, an SOA, and a gain value of the second OA is fixed. However, the present disclosure does not make any limitation to specific type of the second OA, as long as the second OA may amplify the uplink optical signals transmitted from the ONUs.

When the method is performed, the OLT needs to transmit the registration signal to the ONU first. The registration signal does not include transmitting power of the OLT.

In step S302, a gain value of the OA is determined, and the OA is subjected to gain value adjustment according to the determined gain value Specifically, the step of determining the gain value of the OA includes steps S3021 and S3022.

In step S3021, when the registration signal transmitted from the OLT is received, a basic value for current gain value adjustment is determined.

When the ONU receives the registration signal, a basic value for first gain value adjustment of the first OA is determined, and the gain value adjustment is performed based on the basic value.

Furthermore, the step S3021 includes the following steps: when receiving a registration signal transmitted from the OLT for the first time, determining a minimum value of a first gain value of the first OA as the basic value for current gain value adjustment; and when receiving a registration signal transmitted from the OLT for the $n^{th}$ time, determining the first gain value of the first OA obtained after the $(n-1)^t$ adjustment as the basic value for the $n^{th}$ gain value adjustment, where n is an integer greater than or equal to 2.

In step S3022, the basic value is adjusted forward according to a preset gain step value to obtain the first gain value of the first OA after the current adjustment.

After determining a gain value, the gain value is increased by the preset step value, that is, the gain value is increased by a constant value, so as to obtain the first gain value of the first OA after the current adjustment.

In step S303, registration is completed when an uplink optical signal transmitted to the OLT through the OA reaches preset power.

After determining the first gain value of the first OA, an uplink optical signal is transmitted from the ONU, amplified by the first OA and then transmitted to the OLT. If the power of the OLT when receiving the uplink optical signal is an optimal receiving power of the OLT, the registration is completed. However, if the uplink optical signal transmitted to the OLT through the first OA does not reach the preset power, the OLT continues to transmit a downlink optical signal of the registration signal to the ONU, and the ONU side continues to receive the new registration signal transmitted from the OLT. Then, the steps S301 to S303 are repeated until the uplink optical signal transmitted to the OLT through the first OA reaches the preset power, and then the registration can be completed.

With the above technical solution, the ONU may receive the registration signals continuously transmitted from the OLT, and accordingly the first gain value of the first OA may be evenly increased, so that power of the uplink optical signals are adjusted, and the registration is not completed until the uplink optical signal transmitted to the OLT through the first OA reaches the preset power, that is, an uplink optical signal with qualified power can be received by the OLT. Therefore, the above technical solution can solve two problems occurring when OAs used by all ONUs have a same gain, one problem being that optical signals of part of the ONUs are still too small after being amplified and thus fail to meet requirements of bit error rate of an OLT receiver, and the other problem being that optical signals of part of the ONUs are too large after being amplified and thus cause damage to the OLT and the OLT receiver.

In an embodiment of the present disclosure, filters are installed downstream of the first OA and/or downstream of the second OA along transmission paths of the uplink optical signals to filter out Amplified Spontaneous Emission (ASE) noise, thereby achieving optimizing signal-to-noise ratio.

In an embodiment of the present disclosure, if the first gain value of the first OA obtained through the calculation is less than zero, which indicates that the transmitting power of the ONU is too large even without using the first OA, it is unnecessary to amplify the uplink optical signal transmitted from the ONU, so that the first gain value of the first OA and the link attenuation value are adjusted to zero by a variable optical attenuator. Thus, an uplink optical signal with qualified power can be received by the OLT. In an embodiment, the variable optical attenuator may be integrated with the ONU optical module, and may adopt technologies of MEMS, silicon photonics, and so on.

Figure 2:
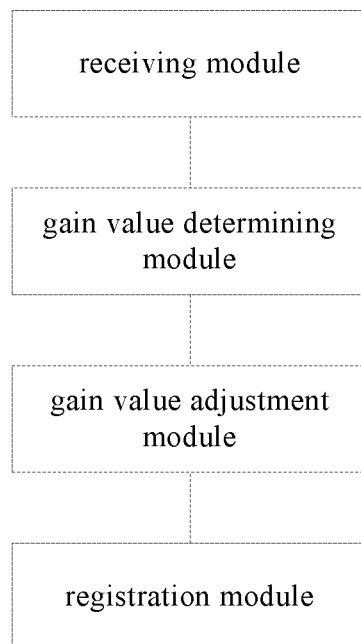
FIG. 2 is a block diagram of a device for amplifying uplink light of a PON according to an embodiment of the present disclosure.
Figure 3:
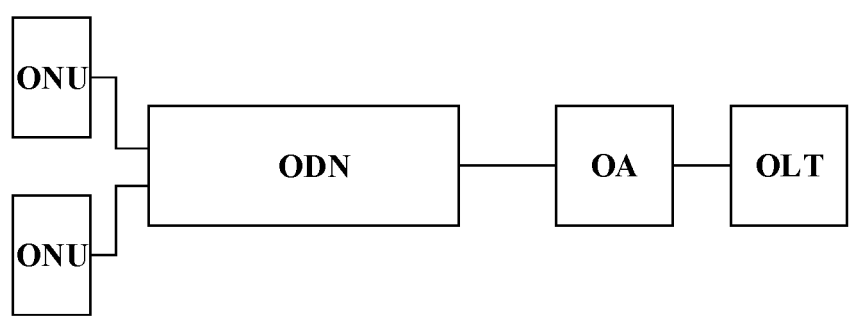
FIG. 3 is a structural schematic diagram of a PON in the prior art.

As can be seen from FIG. 2, the present disclosure further provides a device for amplifying uplink light of a passive optical network. A PON, in which the device may be implemented, includes a plurality of ONUs, an OLT, and an OA provided between each ONU and the OLT. The ONU includes: a receiving module configured to receive a registration signal transmitted from the OLT; a gain value determining module configured to determine a gain value of the OA; a gain value adjustment module configured to perform gain value adjustment on the OA according to the determined gain value; and a registration module configured to complete registration when an uplink optical signal transmitted to the OLT through the OA reaches preset power.

In an embodiment, the OA include a first OA located at an ONU side, the first OA is independent of the ONU side, or the first OA is integrated with the ONU.

In an embodiment, the gain value determining module includes a link attenuation value determining unit configured to determine a link attenuation value according to receiving power of the ONU and downlink signal transmitting power of the OLT when transmitting the registration signal; a gain value determining unit configured to determine a first gain value of the first OA according to transmitting power of the ONU, receiving power of the OLT, and the link attenuation value.

In an embodiment, the gain value determining module includes a basic value determining unit configured to determine a basic value for current gain value adjustment when the registration signal transmitted from the OLT is received; and a gain value adjusting unit configured to adjust the basic value forward according to a preset gain step value so as to obtain the first gain value of the first OA after the adjustment.

In an embodiment, the basic value determining unit includes an adjustment unit configured to, when receiving a registration signal transmitted from the OLT for the first time, determine a minimum value of a first gain value of the first OA as the basic value for current gain value adjustment; and a forward adjustment unit configured to, when receiving a registration signal transmitted from the OLT for the $n^{th}$ time, determine the first gain value of the first OA obtained after the $(n-1)^{th}$ adjustment as the basic value for the $n^{th}$ gain value adjustment, where n is an integer greater than or equal to 2.

In an embodiment, the device further includes a continuous receiving module configured to continue to receive a new registration signal transmitted from the OLT when the uplink optical signal transmitted to the OLT through the OA does not reach the preset power.

In an embodiment, the OA further include a second OA located at an OLT side, the second OA is independent of the OLT side, or the second OA is integrated with the OLT.

In an embodiment, the gain value determining module further includes: a second gain value determining unit configured to determine a second gain value of the second OA; a secondary link attenuation value determining unit configured to determine a link attenuation value according to receiving power of the ONU and downlink signal transmitting power of the OLT when transmitting the registration signal; and a secondary gain value determining unit configured to determine the first gain value of the first OA according to transmitting power of the ONU, receiving power of the OLT, the determined second gain value of the second OA, and the link attenuation value.

In an embodiment, the gain value determining module further includes: a secondary basic value determining unit configured to determine a basic value for current gain value adjustment when receiving a registration signal transmitted from the OLT; and a secondary forward adjustment unit configured to adjust the basic value forward according to a preset gain step value so as to obtain the first gain value of the first OA after the adjustment.

Figure 8:
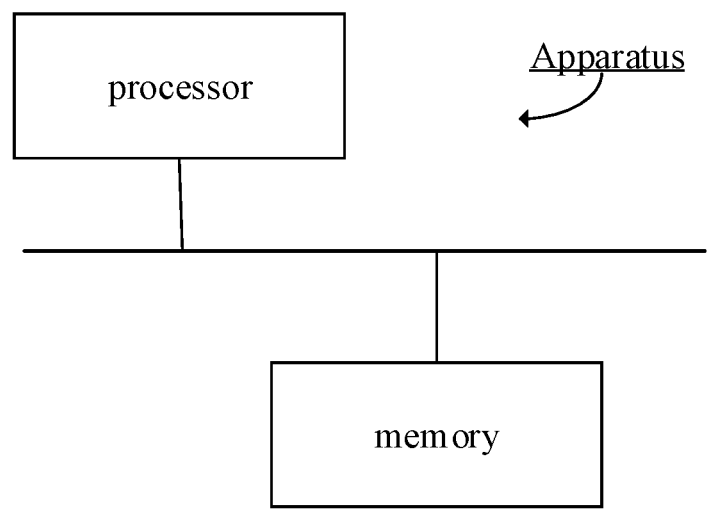
FIG. 8 is a block diagram of an apparatus for amplifying uplink light of a PON according to an embodiment of the present disclosure.

The present disclosure further provides an apparatus, including a processor and a memory configured to store computer instructions, and the processor is configured to execute the computer instructions stored in the memory, so as to perform the above method for amplifying uplink light of a passive optical network. FIG. 8 is a block diagram of an apparatus for amplifying uplink light of a PON according to an embodiment of the present disclosure.

Since the method for amplifying uplink light of a passive optical network has been illustrated in detail by the above embodiments, processes of implementing the method will not be repeated herein.

The present disclosure further provides a computer-readable storage medium which stores one or more programs, which can be executed by one or more processors to perform the above method for amplifying uplink light of a passive optical network.

Since the method for amplifying uplink light of a passive optical network has been illustrated in detail by the above embodiments, the processes of implementing the method will not be repeated herein.

It should be noted that, in the present disclosure, the terms "includes", "comprises" or any other variation thereof are intended to indicate a non-exclusive inclusion, so that a process, method, article, or device, which includes a series of elements, does not only include those listed elements but also include other elements which are not explicitly listed, or the elements inherent in such process, method, article, or device. If there are no more limitations, limiting an element by "including a . . . " does not exclude the existence of other identical elements in the process, method, article, or device which includes the element.

Through the above description of the embodiments, it is clear to those skilled in the art that the method illustrated by the above embodiments may be implemented by software together with a necessary general hardware platform, and may also be implemented by hardware alone, but the former is a better implementation way in many cases. Based on such understanding, essential parts of the technical solutions of the present disclosure or the parts that contribute to the prior art may be implemented in the form of a software product, which is stored in a storage medium (such as an ROM/RAM, a magnetic disk, and an optical disc) and includes a plurality of instructions for enabling a terminal (which may be a mobile phone, a computer, a server, an air conditioner, or a network device, etc.) to perform the method according to the embodiments of the present disclosure.

The embodiments of the present disclosure are described above with reference to the drawings, but the present disclosure is not limited to the above specific embodiments. The above specific embodiments are merely exemplary, but are not restrictive. Without departing from the spirit of the present disclosure and the protection scope of the claims, various modifications and variations may be made by those skilled in the art in light of the present disclosure, and should be considered to fall within a protection scope of the present disclosure.

What is claimed is:

1. A method for amplifying uplink light of a passive optical network (PON), wherein the PON comprises an optical network unit (ONU), an optical line terminal (OLT), and an optical amplifier (OA), and the method comprises:
   receiving, by the ONU, a registration signal transmitted from the OLT;
   determining, by the ONU, a gain value of the OA, based on the registration signal; and
   performing, by the ONU, gain value adjustment on the OA according to the determined gain value, so that registration is completed when an uplink optical signal transmitted to the OLT through the OA reaches preset power.

2. The method of claim 1, wherein the OA comprises a first OA located on an ONU side; and
   the first OA is separate from the ONU, or integrated with the ONU.

3. The method of claim 2, wherein the step of determining the gain value of the OA comprises:
   determining, by the ONU, a link attenuation value according to receiving power of the ONU and downlink signal transmitting power of the OLT when transmitting the registration signal; and
   determining, by the ONU, a first gain value of the first OA as the gain value of the OA according to transmitting power of the ONU, receiving power of the OLT, and the link attenuation value.

4. The method of claim 2, wherein the step of determining the gain value of the OA comprises:
   determining, by the ONU, a basic value for current gain value adjustment when receiving the registration signal transmitted from the OLT; and
   adjusting, by the ONU, the basic value forward according to a preset gain step value to obtain a first gain value of the first OA after the current gain value adjustment.

5. The method of claim 4, wherein the step of determining the basic value for the current gain value adjustment when receiving the registration signal transmitted from the OLT comprises:
   when receiving a registration signal transmitted from the OLT for the first time, determining, by the ONU, a minimum value of the first gain value of the first OA as the basic value for the current gain value adjustment; and
   when receiving a registration signal transmitted from the OLT for the $n^{th}$ time, determining, by the ONU, the first gain value of the first OA obtained after the $(n-1)^{th}$ gain value adjustment performed according to a registration signal transmitted for the $(n-1)^{th}$ time as the basic value for the $n^{th}$ gain value adjustment, where n is an integer greater than or equal to 2.

6. The method of claim 4, further comprising:
   receiving, by the ONU, a new registration signal transmitted from the OLT when the uplink optical signal transmitted to the OLT through the OA does not reach the preset power.

7. The method of claim 2, wherein the OA further comprises a second OA located at an OLT side; and
   the second OA is separate from the OLT, or integrated with the OLT.

8. The method of claim 7, wherein the step of determining the gain value of the OA comprises:
   determining, by the ONU, a second gain value of the second OA;
   determining, by the ONU, a link attenuation value according to receiving power of the ONU and downlink signal transmitting power of the OLT when transmitting the registration signal; and
   determining, by the ONU, a first gain value of the first OA as the gain value of the OA according to transmitting power of the ONU, receiving power of the OLT, the determined second gain value of the second OA, and the link attenuation value.

9. The method of claim 7, wherein the step of determining the gain value of the OA comprises:
   determining, by the ONU, a basic value for current gain value adjustment when receiving the registration signal transmitted from the OLT; and
   adjusting, by the ONU, the basic value forward according to a preset gain step value to obtain a first gain value of the first OA after the current gain value adjustment.

10. The method of claim 9, further comprising:
receiving, by the ONU, a new registration signal transmitted from the OLT when the uplink optical signal transmitted to the OLT through the OA does not reach the preset power.

11. The method of claim 3, wherein the PON further comprises a variable optical attenuator provided between the ONU and the OLT; and
when the determined gain value of the OA is less than zero, the gain value of the OA and the link attenuation value are adjusted to zero by the variable optical attenuator.

12. An apparatus for amplifying uplink light of a passive optical network (PON), applied to an optical network unit (ONU), wherein the PON comprises the ONU, an optical line terminal (OLT), and an optical amplifier (OA), and the apparatus comprises:
a memory configured to store computer instructions; and
a processor configured to execute the computer instructions stored in the memory, so as to perform a method comprising:
receiving a registration signal transmitted from the OLT;
determining a gain value of the OA, based on the registration signal; and
performing gain value adjustment on the OA according to the determined gain value, so that registration is completed when an uplink optical signal transmitted to the OLT through the OA reaches preset power.

13. A non-transitory computer-readable storage medium, storing one or more programs which, when executed by one or more processors, cause the one or more processors to perform the method for amplifying uplink light of a passive optical network according to claim 1.

14. The method of claim 8, wherein the PON further comprises a variable optical attenuator provided between the ONU and the OLT; and
when the determined gain value of the OA is less than zero, the gain value of the OA and the link attenuation value are adjusted to zero by the variable optical attenuator.

15. The apparatus of claim 12, wherein the OA comprises a first OA located on an ONU side; and the first OA is separate from the ONU, or integrated with the ONU; and
the processor is further configured to execute the computer instructions stored in the memory, so as to perform:
determining a link attenuation value according to receiving power of the ONU and downlink signal transmitting power of the OLT when transmitting the registration signal; and
determining a first gain value of the first OA as the gain value of the OA according to transmitting power of the ONU, receiving power of the OLT, and the link attenuation value.

16. The apparatus of claim 12, wherein the OA comprises a first OA located on an ONU side; and the first OA is separate from the ONU, or integrated with the ONU; and
the processor is further configured to execute the computer instructions stored in the memory, so as to perform:
determining a basic value for current gain value adjustment when receiving the registration signal transmitted from the OLT; and
adjusting the basic value forward according to a preset gain step value to obtain a first gain value of the first OA after the current gain value adjustment.

17. The apparatus of claim 12, wherein the OA comprises a first OA located on an ONU side; and the first OA is separate from the ONU, or integrated with the ONU;
the OA further comprises a second OA located at an OLT side; and the second OA is separate from the OLT, or integrated with the OLT; and
the processor is further configured to execute the computer instructions stored in the memory, so as to perform:
determining a second gain value of the second OA;
determining a link attenuation value according to receiving power of the ONU and downlink signal transmitting power of the OLT when transmitting the registration signal; and
determining a first gain value of the first OA as the gain value of the OA according to transmitting power of the ONU, receiving power of the OLT, the determined second gain value of the second OA, and the link attenuation value.

18. The apparatus of claim 12, wherein the OA comprises a first OA located on an ONU side; and the first OA is separate from the ONU, or integrated with the ONU;
the OA further comprises a second OA located at an OLT side; and the second OA is separate from the OLT, or integrated with the OLT; and
the processor is further configured to execute the computer instructions stored in the memory, so as to perform:
determining a basic value for current gain value adjustment when receiving the registration signal transmitted from the OLT; and
adjusting the basic value forward according to a preset gain step value to obtain a first gain value of the first OA after the current gain value adjustment.

* * * * *